United States Patent
Shah et al.

(10) Patent No.: US 8,028,176 B2
(45) Date of Patent: Sep. 27, 2011

(54) SYSTEM AND METHOD FOR MODELING A POWER OVER ETHERNET COMPONENT IN A COMPUTING DEVICE PLATFORM USING A COMMON INFORMATION MODEL

(75) Inventors: Hemal Vinodchandra Shah, Trabuco Canyon, CA (US); Wael William Diab, San Francisco, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 723 days.

(21) Appl. No.: 12/106,179

(22) Filed: Apr. 18, 2008

(65) Prior Publication Data
US 2008/0263374 A1 Oct. 23, 2008

Related U.S. Application Data

(60) Provisional application No. 60/912,669, filed on Apr. 18, 2007.

(51) Int. Cl.
*G06F 1/26* (2006.01)
*G06F 1/32* (2006.01)
*G06F 1/00* (2006.01)

(52) U.S. Cl. .......................... 713/300; 713/320; 713/321

(58) Field of Classification Search ................... 713/300, 713/320, 321
See application file for complete search history.

(56) References Cited

U.S. PATENT DOCUMENTS

| | | | |
|---|---|---|---|
| 7,152,168 B2* | 12/2006 | Boynton et al. | 713/300 |
| 2007/0110360 A1* | 5/2007 | Stanford | 385/14 |
| 2008/0005305 A1* | 1/2008 | Hass et al. | 709/223 |
| 2008/0030185 A1* | 2/2008 | Metsker et al. | 323/304 |

OTHER PUBLICATIONS

Barry Shilmover and Sasha Nosov, "Platform Management Using Web Services—Updates and Directions," WINHEC 2006.
DMTF, "Systems Management Architecture for Mobile and Desktop Hardware White Paper," Version 1.1.0, Dec. 2007.

* cited by examiner

*Primary Examiner* — Thomas Lee
*Assistant Examiner* — Samantha Hoang
(74) *Attorney, Agent, or Firm* — Duane S. Kobayashi

(57) ABSTRACT

A system and method for modeling a power over Ethernet component using a common information model. With the profiling of components based on the common information model, a remote agent can query status/capabilities or configure a power over Ethernet component based on messaging that is consistent with a power over Ethernet common information model schema.

13 Claims, 7 Drawing Sheets

SYSTEM AND METHOD FOR MODELING A POWER OVER ETHERNET COMPONENT IN A COMPUTING DEVICE PLATFORM USING A COMMON INFORMATION MODEL

This application claims priority to provisional application No. 60/912,669, filed Apr. 18, 2007, which is incorporated by reference herein, in its entirety, for all purposes.

BACKGROUND

1. Field of the Invention

The present invention relates generally to Power over Ethernet (PoE) and, more particularly, to a system and method for modeling a PoE component using a common profile model.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VOIP) phones, wireless LAN access points, Bluetooth access points, network cameras, computing devices, etc.

In an enterprise environment, management of various PoE services and assets represents a significant challenge to IT administrators. A key area of concern is obtaining a proper inventory of such services and assets in an efficient manner. What is needed therefore is a mechanism that enables a remote agent to query status/capabilities and configure specific functions of PoE components.

SUMMARY

A system and/or method for modeling a PoE component using a common profile model, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
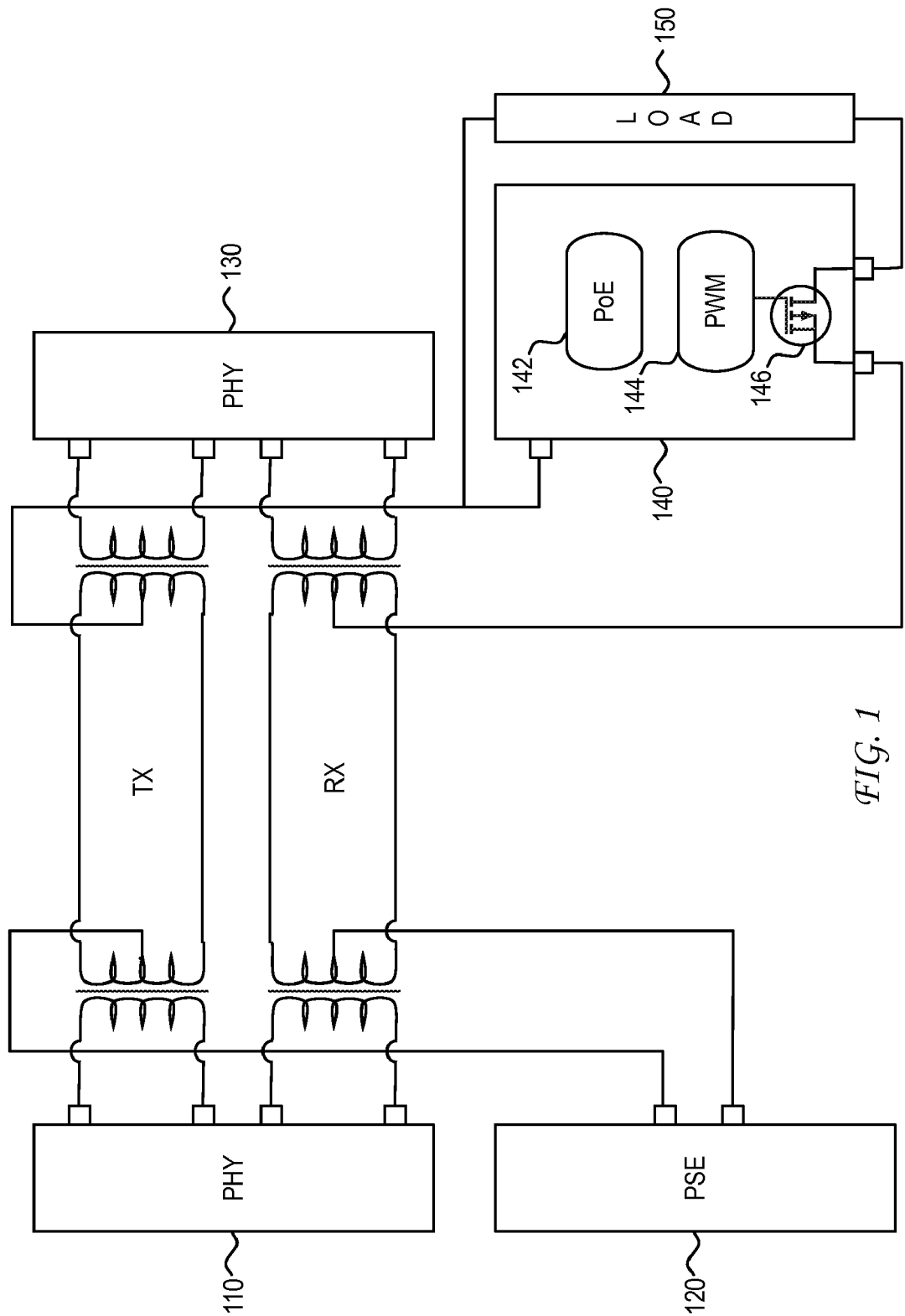
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150. In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other software controlled device such as embedded devices having an operating system (OS). This computing device can have highly varying power requirements depending on the existence and state of operation of various internal or externally supported components. These components need not be uniform and can vary greatly between devices depending on the manufacturer and component suppliers. As noted, power usage can be highly dependent on the application(s) running on the computing device. In one operating state, the computing device can be in relatively idle state or performing simple tasks such as word processing. In another operating state, the computing device can be performing a variety of simultaneous tasks such as video encoding, disc burning, game playing, and even powering other USB devices. In another operating state, the CPU(s) and system memory will be offline and the operating system/host software will not be running. In this OS-absent state, only a few components like a LAN device (possibly integrated with a management controller) will be running offline applications like management. In general, transitions between operating states such as those exemplified above, can be rapid and continual.

Figure 2:
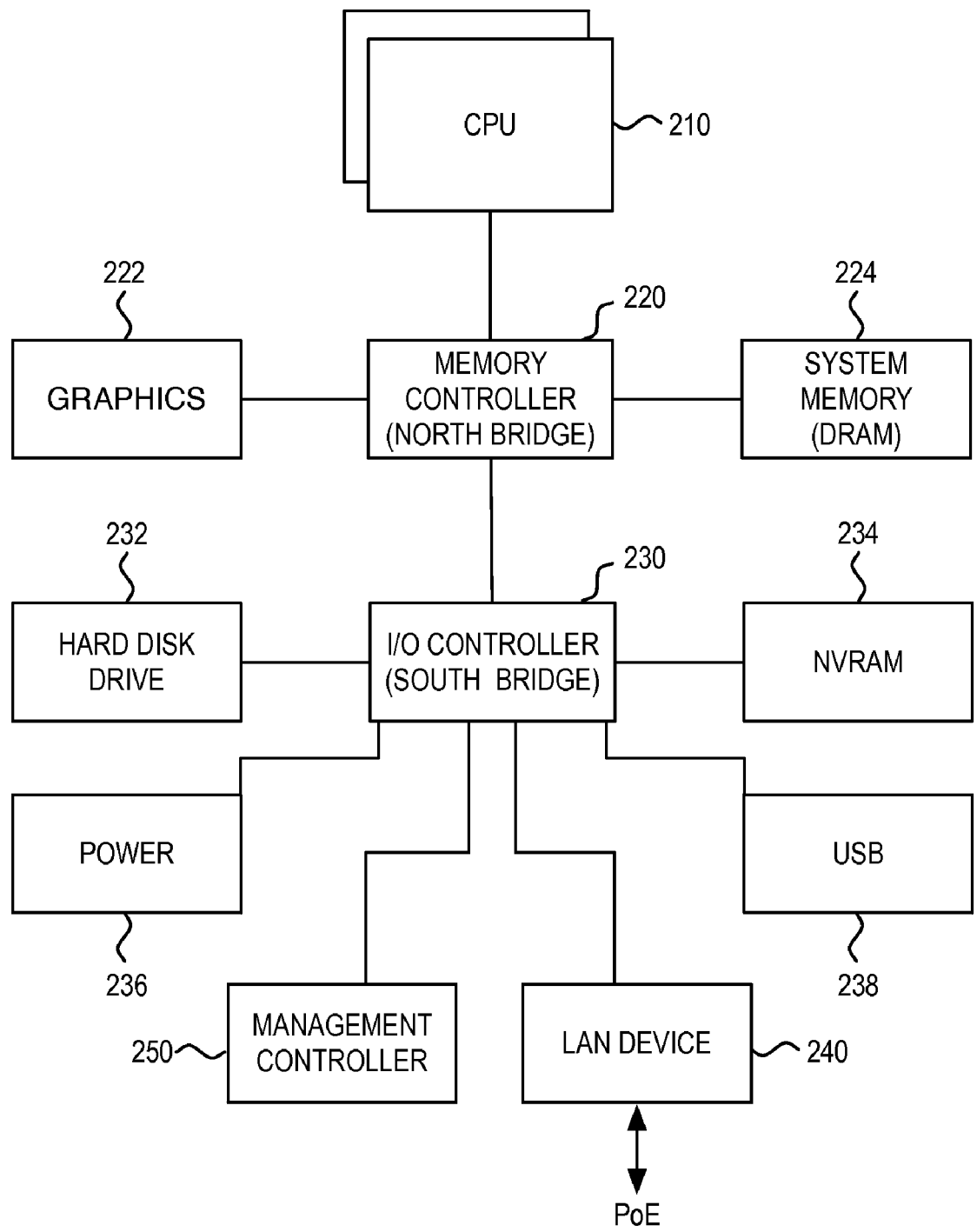
FIG. 2 illustrates an embodiment of a portable computing device.

In the illustration of FIG. 2, a computing device includes conventional computing components such as CPU(s) 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232, nonvolatile RAM (NVRAM) 234, power subsystem 236 and USB controller 238. As would be appreciated, the example embodiment of FIG. 2 is not intended to be exhaustive or limiting. Various other memory controller and I/O controller configurations can be used with the principles of the present invention.

As FIG. 2 further illustrates, I/O controller 230 is also in communication with LAN device 240. In general, LAN device 240 provides networking functionality onto the motherboard, thereby eliminating the need for an add-in network interface card (NIC). In one embodiment, LAN device 240 includes a fully integrated 10/100/1000BASE-T Gigabit Ethernet media access controller (MAC), PCI Express bus interface, on-chip buffer memory, and integrated physical layer (PHY) transceiver in a single-chip solution. In other embodiments, the PHY may not be integrated such as when initially supporting higher-end PHYs (e.g., 10GBASE-T). In other embodiments, LAN device 240 can also include a wireless communication component.

LAN device 240 can be designed to gain access to power management information for use by PoE management. In various examples, power management information can include one or more of the following: battery information (e.g., battery capacity, battery life, etc.); CPU status information (e.g., running, idle, etc.); CPU performance information (e.g., supply voltage, processor frequency, etc.); device state information for devices such as a hard drive, DVD drive, USB device, etc.; system information (e.g., active, sleeping, etc.); application load information; user priority levels; or any other information that would be relevant to power management.

In one embodiment, LAN device 240 can be designed to interrogate components (e.g., battery) in the computing device for the power management information. In another embodiment, LAN device 240 can receive power management information from a collection component in the computing device. In general, this collection component can be designed to retrieve power management information from the various hardware and/or software components in the computing device and deliver the retrieved power management information to LAN device 240. In one embodiment, the collection component is embodied in software such as a driver, an application, an operating system, etc.

Regardless of the method by which LAN device 240 gains access to the power management information, the information relevant to PoE management of the computing device can be communicated over the network such that IT administrators can get a status on their enterprise inventory.

In one embodiment, LAN device 240 (possibly with an integrated management controller) can also be used in an OS-absent environment (with CPU(s), chipset, and system memory powered down) to run offline applications. In various embodiments, the management controller is a discrete device such as that illustrated in FIG. 2, or can be integrated with memory controller 220, I/O controller 230, LAN device 240, etc. In one scenario, IT administrators can communicate with LAN device 240 even when the computing device's OS is hibernating. For example, the OS can provide state information to LAN device 240 prior to the OS going to sleep. This state information can then be retrieved by an IT administrator while the OS is sleeping. In another example, the IT administrator can update various power management parameters in LAN device 240 that would be read by the OS when it awakes. In yet another example, the IT administrator can perform an upgrade or other management to the computing device through a request on wake on LAN event through LAN device 240.

In one embodiment, the computing device can be configured to generate a PoE power request/priority. In one example, the OS can be configured to map power management information (e.g., power states) to a power request/priority. In another example, the OS can be configured to pass on power management information to LAN device 240 for mapping to a power request/priority. In this embodiment, the IT administrator may want to upgrade or otherwise configure the algorithm in the computing device that generates the PoE power request/priority. For example, the IT administrator may want to update that algorithm globally regardless of the state of the computing device.

Even if the decision algorithm is performed in the switch, configuration of the computing device can also be important. In one scenario, the IT administrator may want to configure the frequency at which the collection component retrieves certain power management parameters from the computing device. For example, the IT administrator may want the battery capacity parameter to be read every 20 seconds. The new refresh rate parameter could then be transmitted to the LAN device for use in configuring the collection component in the computing device.

To facilitate the management of the enterprise network, the principles of the present invention enable profiling of PoE services and components. With this profiling, various management functions can be supported. For example, a remote agent can query the status/capabilities of a switch and configure specific functions in the switch. In another example, a remote agent can query the status/capabilities of a computing device and configure specific functions in the computing device. In yet another example, a computing device can query a switch to determine its capabilities and submit power requests.

For PoE, specific PoE-related profiles can be defined and added for the distributed management. A computing device platform, for example, can use multiple sets of parameters (as part of the profile) that are related (but not limited) to the system power requirement, system classification, and status.

In one embodiment, the principles of the present invention can be related to the common information model (CIM) that the Distributed Management Task Force (DMTF) creates for each standard component in the platform. In general, CIM is a conceptual information model for describing management that is not bound to a particular implementation. This enables the interchange of management information between management systems and applications. In accordance with the present invention, CIM profiles can be created and associated with power management services and components.

Figure 3:
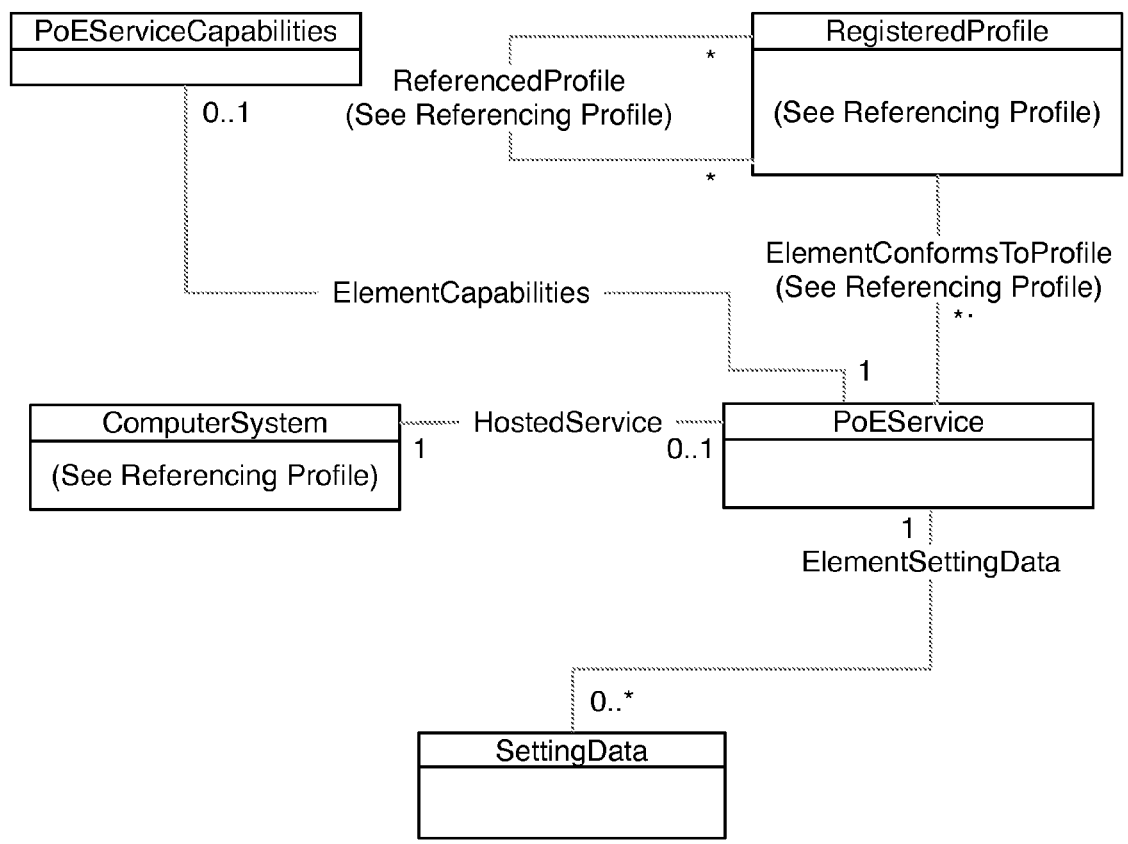
FIG. 3 illustrates an example of a class schema for a PoE service profile.

FIG. 3 illustrates an example of a class schema for a PoE service profile that describes the PoE service, its capabilities and settings. In this example, the PoEService class describes the service characteristics and the PoEServiceCapabilities class describes the capabilities of the PoE service. Also, the class diagram shows the scoping managed system and the profile registration classes. For simplicity, the prefix CIM_ has been removed from the names of the classes.

Figure 4:
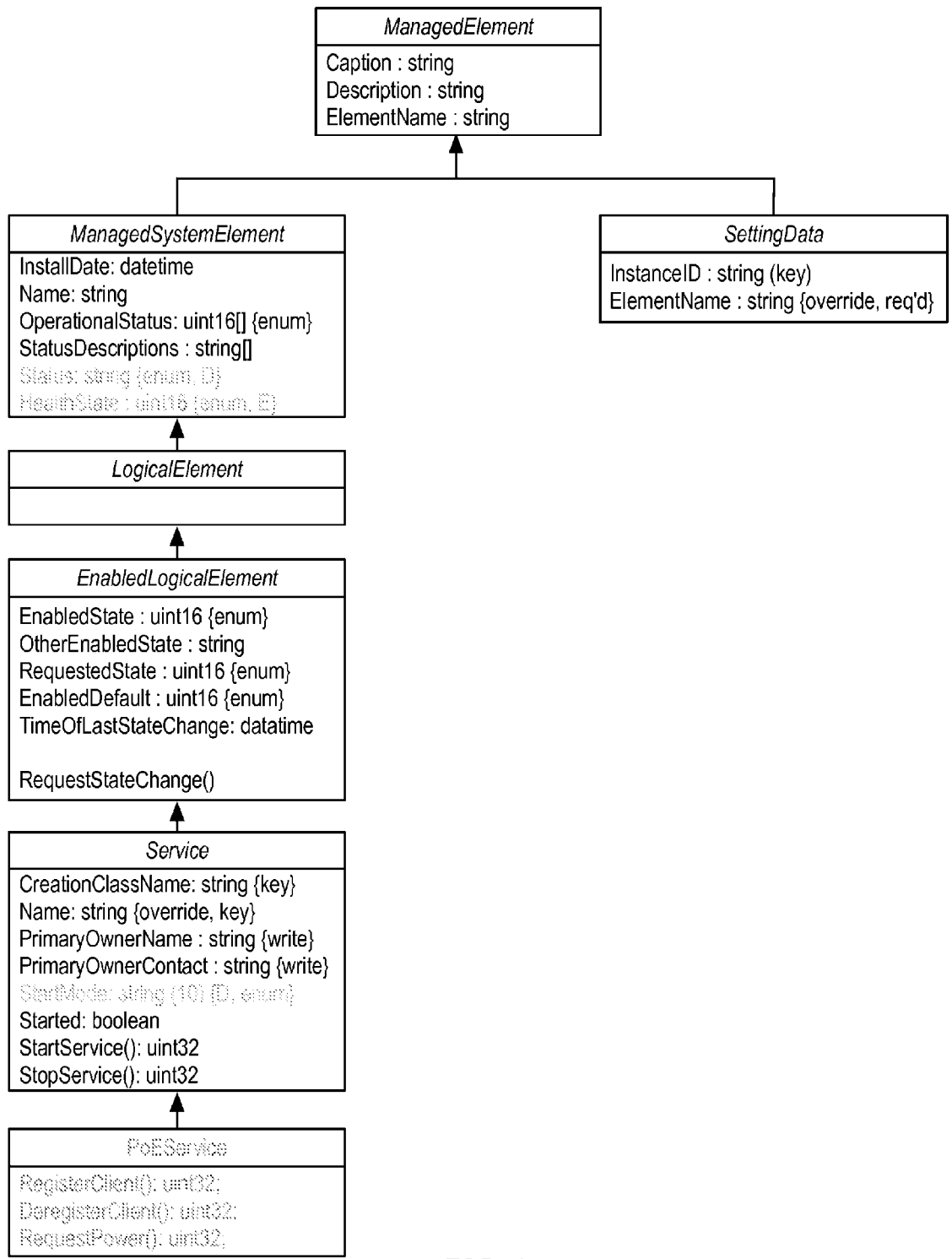
FIG. 4 illustrates a common information model hierarchy.

The PoEService class can be used to manage a switch that is providing PoE service to PD clients (e.g., computing devices). This switch can have capabilities such as total power capacity, total number of supportable clients, etc., and properties such as total power allocated, max available power per client, client priority levels, etc. FIG. 4 illustrates the PoEService class within a CIM hierarchy.

Intrinsic and extrinsic methods can be defined for the CIM elements defined by this profile. For example, an extrinsic CIM_PoEService.StartService( ) method can be used to place the Service in the started state. This method would return an integer value of 0 if the Service was successfully started, 1 if the request is not supported, and any other number to indicate an error. Similarly, an extrinsic CIM_PoEService.StopService( ) method can be used to place the Service in the stopped state. This method would return an integer value of 0 if the Service was successfully stopped, 1 if the request is not supported, and any other number to indicate an error. Additionally, an extrinsic $CIM_{13}$ PoEService.RequestStateChange( ) method can be used to change the element's state to the value that is specified in the RequestedState parameter (e.g., Enabled, Disabled, Shut Down, Offline, Test, Defer, Quiesce, Reboot, Reset, etc.). This method would return an integer value of 0 if the request was successfully executed, 1 if the method is not supported, 2 if an error occurred, and any other number to indicate job started. It should be noted that invoking the CIM_PoEService.RequestStateChange( ) method multiple times could result in earlier requests being overwritten or lost.

In addition to the extrinsic methods described above, extrinsic methods can be defined within the PoEService class itself. In one embodiment, an extrinsic CIM_PoEService.RegisterClient( ) method can be defined for use by a client of the PoE service to register itself with the service. Here, the input parameters can contain information about the client and the output parameter is a ClientID. In this framework, registration with the service would provide security and enable the service to keep track of registered PoE clients (e.g., priority levels, etc.). Similarly, an extrinsic CIM_PoEService.DeregisterClient( ) method can be defined for use by the client of the PoE service to deregister itself from the service. Here, the input parameters contain a ClientID that identifies a client. Additionally, an extrinsic CIM_PoEService.RequestPower( ) method can be defined for use by the client to request power from the PoE service. In one embodiment, the input parameter can provide a delta of power that the client needs from its current power level. This delta can be positive or negative, thereby facilitating an increase or decrease in the allocated power to the client.

Figure 5:
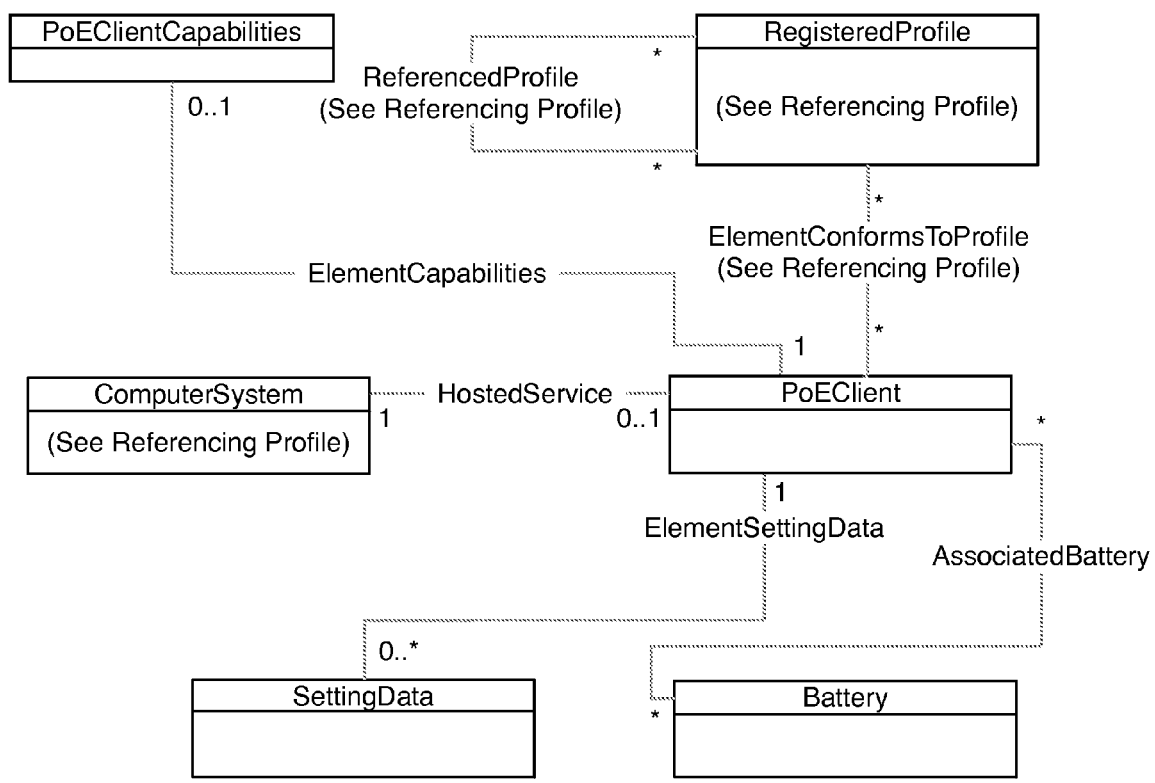
FIG. 5 illustrates an example of a class schema for a PoE client profile.

FIG. 5 illustrates an example of a class schema for a PoE client profile that describes the PoE client, its capabilities and settings. As illustrated, the AssociatedBattery association class associates the instances of the batteries that are provided power by the PoE client. Also, the class diagram shows the scoping managed system and the profile registration classes. Again, for simplicity, the prefix CIM_ has been removed from the names of the classes. The PoEClient class can be used to manage a PoE computing client. This computing client can have properties such as allocated power, last requested power, etc.

Extrinsic methods can also be defined for the CIM elements defined by this profile. For example, an extrinsic CIM_PoEClient.RequestStateChange( ) method can be used to change the element's state to the value that is specified in the RequestedState parameter (e.g., Enabled, Disabled, Shut Down, Offline, Test, Defer, Quiesce, Reboot, Reset, etc.). This method would return an integer value of 0 if the request was successfully executed, 1 if the method is not supported, 2 if an error occurred, and any other number to indicate job started. It should be noted that invoking the CIM_PoEClient.RequestStateChange( ) method multiple times could result in earlier requests being overwritten or lost.

Figure 6:
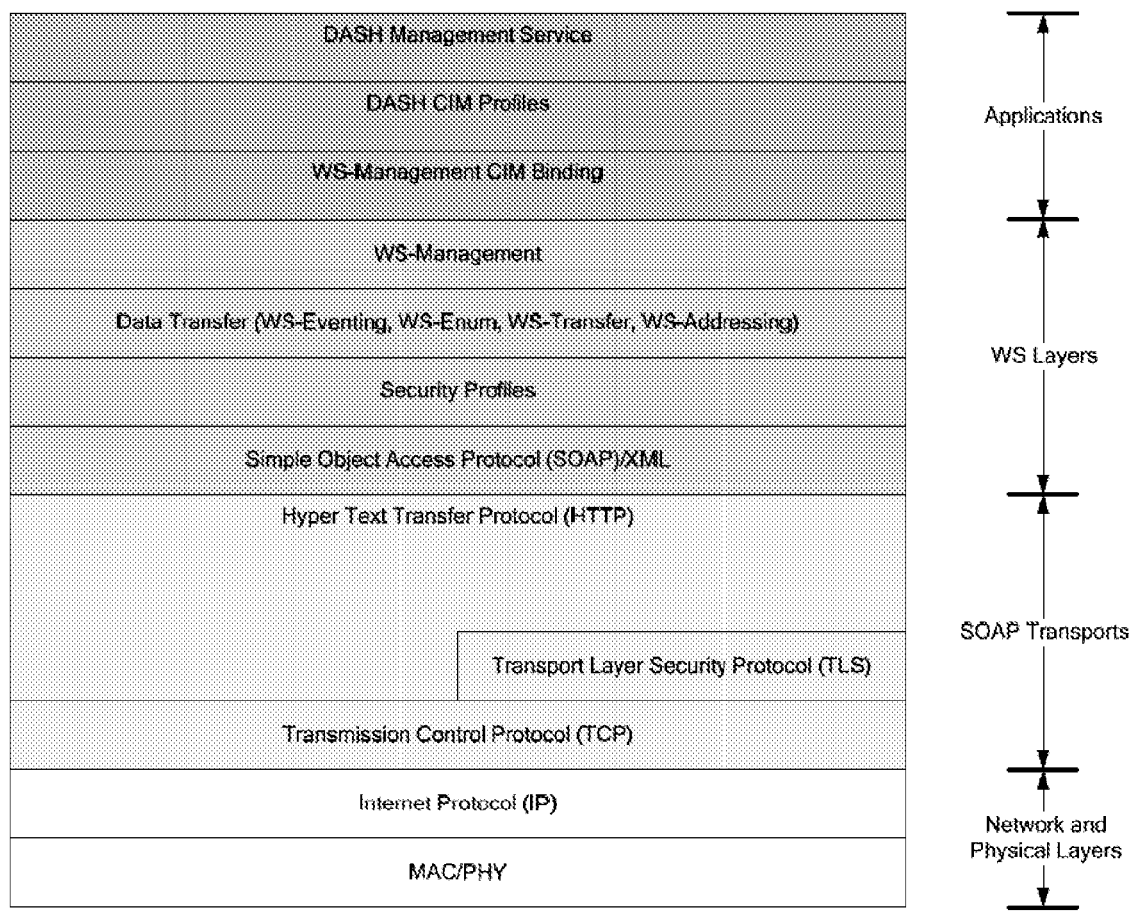
FIG. 6 illustrates a general protocol stack for web services for management.

As has been described, the CIM-based data model can be used for representing managed resources and services. The exchange of management information can be enabled through the encapsulation of CIM-based operations in a management protocol that is itself encapsulated in a transport protocol. FIG. 6 illustrates a general protocol stack for such an implementation.

The web services for management (WS-Management) protocol is based on web services, with the transport layer, network layer and physical layer occupying the lowest layers in the protocol stack. Above the simple object access protocol (SOAP)/XML layer is the data transfer layer, which is based on multiple web services specifications (i.e., WS-transfer, WS-Enumeration, and WS-Eventing for the transfer of management information). The top three layers represent the WS Management applications. The desktop and mobile architecture for system hardware (DASH) profiles are mapped over the WS Management protocol stack using the WS Management CIM Binding. In general, the WS-Management CIM Binding specification defines the binding between the web services representation of CIM and WS management.

With the WS Management protocol stack, various management uses scenarios can be enabled. In one example, a computing device that is capable of executing the entire protocol stack can request power from a switch. When the computing device is connected to the switch, the computing device can send a request to the switch to determine whether the switch supports CIM profiles. If so, the computing device can get an instance of a PoE Service and determine its capabilities. If registering is required, the computing device can then register itself using the CIM_PoEService.RegisterClient( ) method. If registration is successful, then the computing device can check its own power level and determine an amount of power to be requested. A power request is then transmitted using the CIM_PoEService.RequestPower( ) method. If the CIM_PoEService.RequestPower( ) method returns a confirmation, then the computing device would then receive power from the switch.

In another example, an IT administrator may want to identify all conference room switches that are PoE capable. The IT administrator could then get all instances of PoE Services. The IT administrator could then perform various administration tasks such as obtaining the operational state of each PoE Service, requesting a state change using a CIM_PoEService.RequestPower( ) method, modifying service capabilities (e.g., policies, clients, etc.) or otherwise configuring a PoE Service.

In yet another example, an IT administrator may want to access all corporate computers and enable PoE Clients. In this process, the IT administrator could query all computing devices to determine whether they support PoE Client profiles. If a computing device does support a PoE Client profile, then the IT administrator can determine its capabilities and settings. For example, the IT administrator can identify the properties of all batteries in the computing device. With this information, the IT administrator can then configure the PoE client, by defining how much power the PoE client can request, the priority of the power request, etc.

Figure 7:
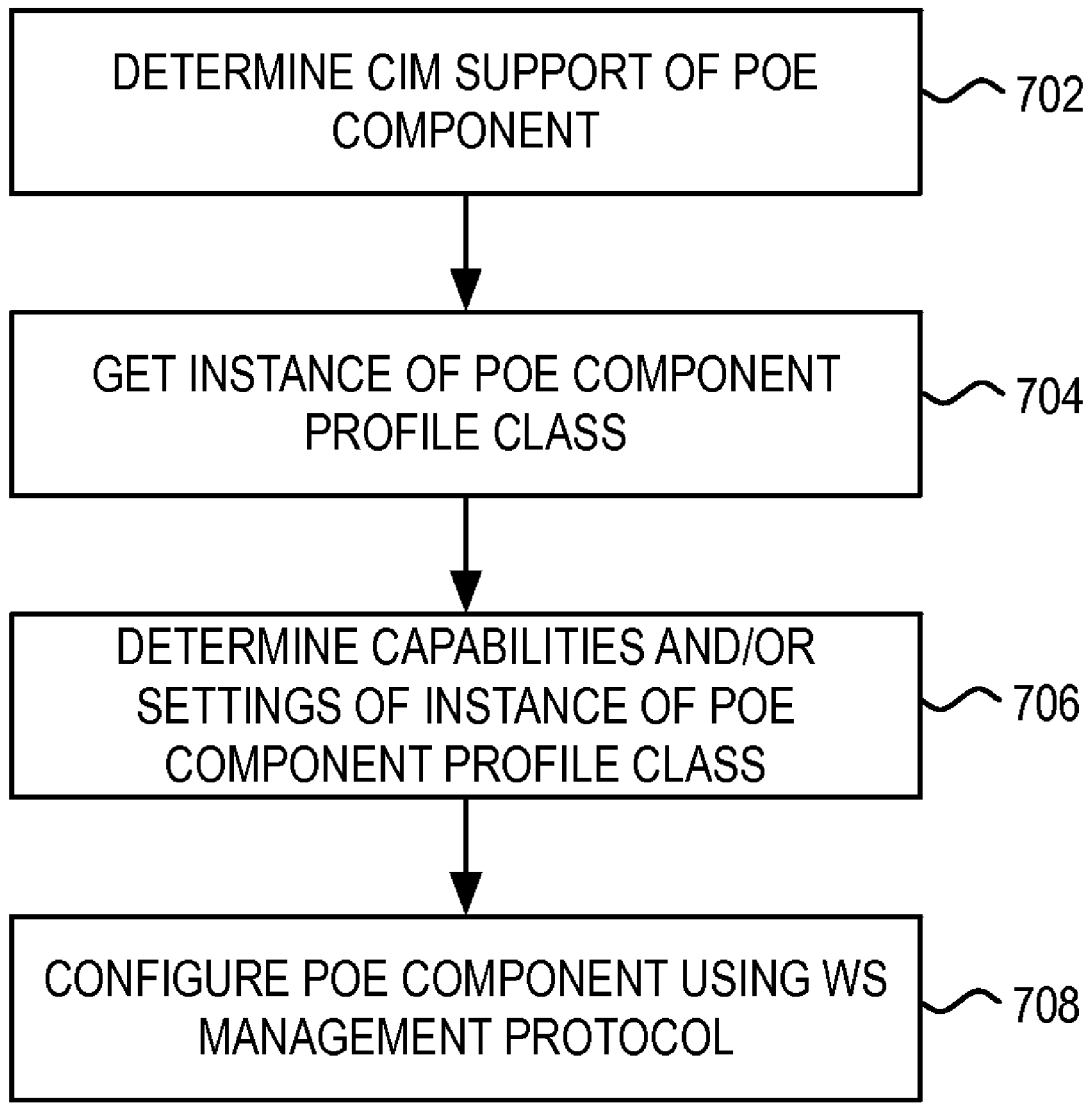
FIG. 7 illustrates a flowchart of a process of the present invention.

As would be appreciated, various use cases can be envisioned using CIM PoE Service and PoE Client models. To further illustrate the principles of the present invention, reference is now made to the flowchart of FIG. 7. As illustrated, the process of FIG. 7 begins at step 702 where a LAN device determines a level of CIM support for a PoE component (e.g., PoE service, client, etc.). As noted in the examples above, this determination can be made by an IT administrator's query of a switch or computing device, a computing device's query of a switch, etc.

Where support of CIM profiles for a PoE component is identified, the LAN device can then get an instance of a PoE component profile class (e.g., PoE Client, PoE Service, etc.) at step 704. This instance, for example, can represent a particular switch or client device. When the instance of the PoE component profile class is obtained, the capabilities and/or settings of the PoE component can be identified. Finally, the LAN device can then configure or lodge requests to the PoE component using the WS Management protocol at step 708.

For example, a request can be lodged using a Request method that is supported by the PoE CIM schema. As described, the CIM schema provides the actual model descriptions and supplies a set of classes with properties and associations that provide a well-understood conceptual framework within which it is possible to organize the available information about the managed environment.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet request method in a computing device, comprising:
   determining a level of common information model support of a power over Ethernet service that is provided by a switch, said switch delivering power to said computing device via an Ethernet cable;
   getting an instance of a supported power over Ethernet service class, said power over Ethernet service class describing characteristcs of said power over Ethnet service; and
   transmitting a power request message to said switch, said power request message being based on a method supported by said power over Ethernet service class.

2. The method of claim 1, wherein said computing device is a portable computer.

3. The method of claim 1, wherein said common information model is a distributed management task force common information model.

4. The method of claim 1, further comprising registering the computing device with said switch using a register client message that is based on a method supported by said power over Ethernet service class.

5. The method of claim 4, further comprising deregistering the computing device with said switch using a deregister client message that is based on a method supported by said power over Ethernet service class.

6. The method of claim 1, wherein said power request message specifies a positive or negative increment of power.

7. The method of claim 1, further comprising transmitting a change state request message to said switch, said change state request message being based on a method supported by said power over Ethernet service class.

8. A power over Ethernet method in a management device, comprising:
   determining, via a query transmitted by said management device to a portable computing device via network communication over an Ethernet cable that couples said portable computing device to a network, a level of common information model support in said portable computing device of a power over Ethernet client class;
   determining a capacity of a battery in said portable computing device based on battery class information that is associated with said power over Ethernet client class; and
   configuring said portable computing device power over Ethernet capability based on a modification of setting data associated with said power over Ethernet client class.

9. The method of claim 8, wherein said computing device is a portable computer.

10. The method of claim 8, wherein said common information model is a distributed management task force common information model.

11. The method of claim 8, wherein said configuring comprises adjusting a priority.

12. The method of claim 8, wherein said configuring comprises adjusting a max allowed power for said portable computing device.

13. The method of claim 8, further comprising transmitting a change state request message to said portable computing device, said change state request message being based on a method supported by said power over Ethernet client class.

* * * * *

UNITED STATES PATENT AND TRADEMARK OFFICE
CERTIFICATE OF CORRECTION

PATENT NO. : 8,028,176 B2
APPLICATION NO. : 12/106179
DATED : September 27, 2011
INVENTOR(S) : Hemal Vinodchandra Shah, Wael William Diab and Simon Assouad It is certified that error appears in the above-identified patent and that said Letters Patent is hereby corrected as shown below:

Column 7, line 29, replace "characteristcs" with --characteristics--.

Column 7, line 29, replace "Ethnet" with --Ethernet--.

Signed and Sealed this
Eighth Day of November, 2011

David J. Kappos
*Director of the United States Patent and Trademark Office*